United States Patent

Takahara et al.

[11] Patent Number: 6,064,161
[45] Date of Patent: May 16, 2000

[54] VEHICLE DRIVE DEVICE AND VEHICLE DRIVE DEVICE CONTROL METHOD

[75] Inventors: Hideaki Takahara, Zama; Keiju Abo, Yokohama; Shojiro Kuroda, Sagamihara, all of Japan

[73] Assignee: Nissan Motor Co., Ltd., Yokohama, Japan

[21] Appl. No.: 09/220,381

[22] Filed: Dec. 24, 1998

[30] Foreign Application Priority Data

Dec. 25, 1997 [JP] Japan ..................................... 9-358583
Oct. 22, 1998 [JP] Japan ................................. 10-301187

[51] Int. Cl.[7] .................................................. B60K 28/16
[52] U.S. Cl. ......................... 318/139; 180/197; 180/65.2; 290/45; 318/376; 318/382
[58] Field of Search ................................. 318/52, 86, 87, 318/139, 375, 376, 382, 383; 290/45; 180/65.2, 65.3, 165, 197

[56] References Cited

U.S. PATENT DOCUMENTS 5,343,970  9/1994  Severinsky .............................. 180/65.2
5,431,241  7/1995  May et al. ............................... 180/197
5,450,324  9/1995  Cikanek ............................. 364/426.02
5,801,497  9/1998  Shamoto et al. ........................ 318/139
5,898,281  4/1999  Bossoney et al. ......................... 318/52

FOREIGN PATENT DOCUMENTS 0 925 988   6/1999   European Pat. Off. ........ B60K 28/16
9-70104     3/1997   Japan .

Primary Examiner—Bentsu Ro
Attorney, Agent, or Firm—Foley & Lardner

[57] ABSTRACT

A motor/generator and drive wheel are connected to an engine, and the drive wheel is driven by the engine and motor/generator according to running conditions. A sensor which detects a slip of the drive wheel and a sensor which detects a depression of an accelerator pedal are provided, and the motor/generator is operated as a generator when the accelerator pedal is depressed and the drive wheel has slipped. Further, a spin of the drive wheel is prevented by increasing the rotation resistance of the motor/generator according to the frictional coefficient of the road surface.

6 Claims, 6 Drawing Sheets

22 ELECTROMAGNETIC POWDER CLUTCH
52 STEP MOTOR
53 CONTROL VALVE
63A DRIVE WHEEL ROTAION SPEED SENSOR
63B NON-DRIVE WHEEL ROTATION SPEED SENSOR
64 SNOW MODE SWITCH
65 ENGINE ROTATION SPEED SENSOR
66 INPUT SHAFT ROTATION SPEED SENSOR
67 OUTPUT SHAFT ROTATION SPEED SENSOR
72 MOTOR/GENERATOR DRIVE CIRCUIT

1 ENGINE
1A STARTER MOTOR
1C STEP MOTOR
5 AIR CONDITIONER
10 MOTOR/GENERATOR
26 MOTOR/GENERATOR
27 TURBINE ROTOR
28 STATOR
50 ELECTRIC MOTOR
51 HYDRAULIC PUMP
60 CASING

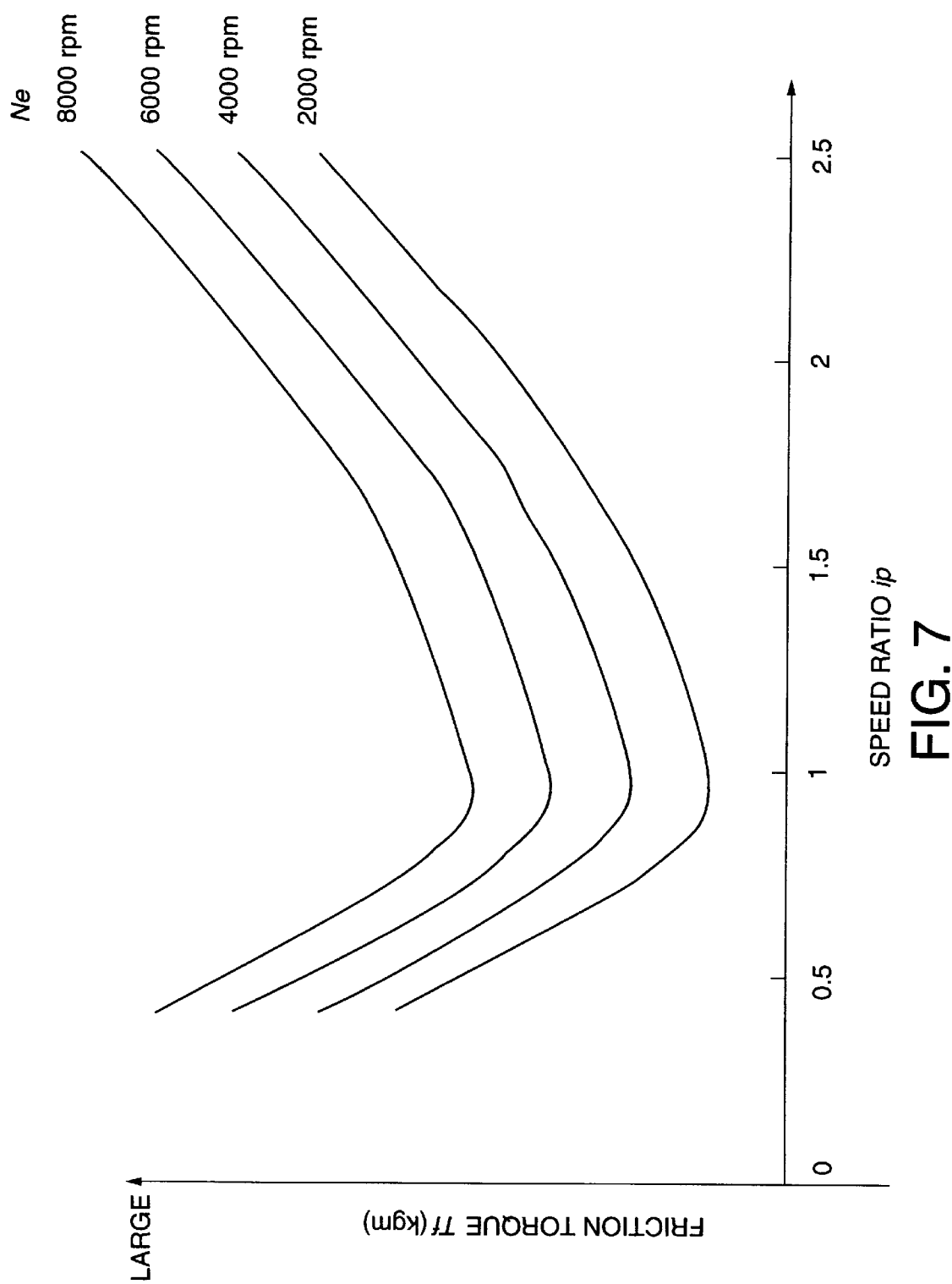

VEHICLE DRIVE DEVICE AND VEHICLE DRIVE DEVICE CONTROL METHOD

FIELD OF THE INVENTION

This invention relates to control of a hybrid vehicle wherein a motor/generator is used together with an engine to obtain running power.

BACKGROUND OF THE INVENTION

Tokkai Hei 9-070104 published by the Japanese Patent Office in 1997 discloses a so-called parallel hybrid vehicle drive device wherein drive wheels are joined to an engine and a motor/generator via a continuously variable transmission. The motor/generator is driven as a motor when power is supplied from a battery, and supplies a rotation torque to the drive wheels. On the other hand when a rotation torque is input from the drive wheels, it performs regenerative braking wherein it generates power and charges the battery, while exerting a brake force on the drive wheels due to the rotation resistance.

SUMMARY OF THE INVENTION

It is an object of this invention to prevent drive wheels from spinning in a vehicle provided with such a vehicle drive device.

It is a further object of this invention to increase the energy efficiency of such a vehicle drive device.

In order to achieve the above objects, this invention provides a vehicle drive device wherein a generator and a drive wheel are connected to an engine which accelerates according to a depression of an accelerator.

The drive device comprises a sensor for detecting a depression of the accelerator, a sensor for detecting a slip of the drive wheel, a drive circuit for varying the rotation resistance of the generator, and a microprocessor programmed to control the drive circuit so as to increase the rotation resistance of the generator if a slip of the drive wheel is detected when the accelerator pedal is depressed.

This invention also provides a control method of a vehicle drive device, wherein the device comprises an engine for driving a drive wheel and a generator according to a depression of an accelerator pedal, and the generator comprises a drive circuit which varies the rotation resistance of the generator.

The control method comprises determining whether or not the accelerator pedal is depressed, determining whether or not the drive wheel is slipping, and controlling the drive circuit to increase the rotation resistance of the generator when the accelerator is depressed and the drive wheel is slipping.

The details as well as other features and advantages of this invention are set forth in the remainder of the specification and are shown in the accompanying drawings.

BRIEF DESCRIPTION OF THE DRAWINGS

FIG. 7 is a diagram describing the contents of a transmission friction torque computing map stored by the motor/generator controller.

DESCRIPTION OF THE PREFERRED EMBODIMENTS

Figure 1:
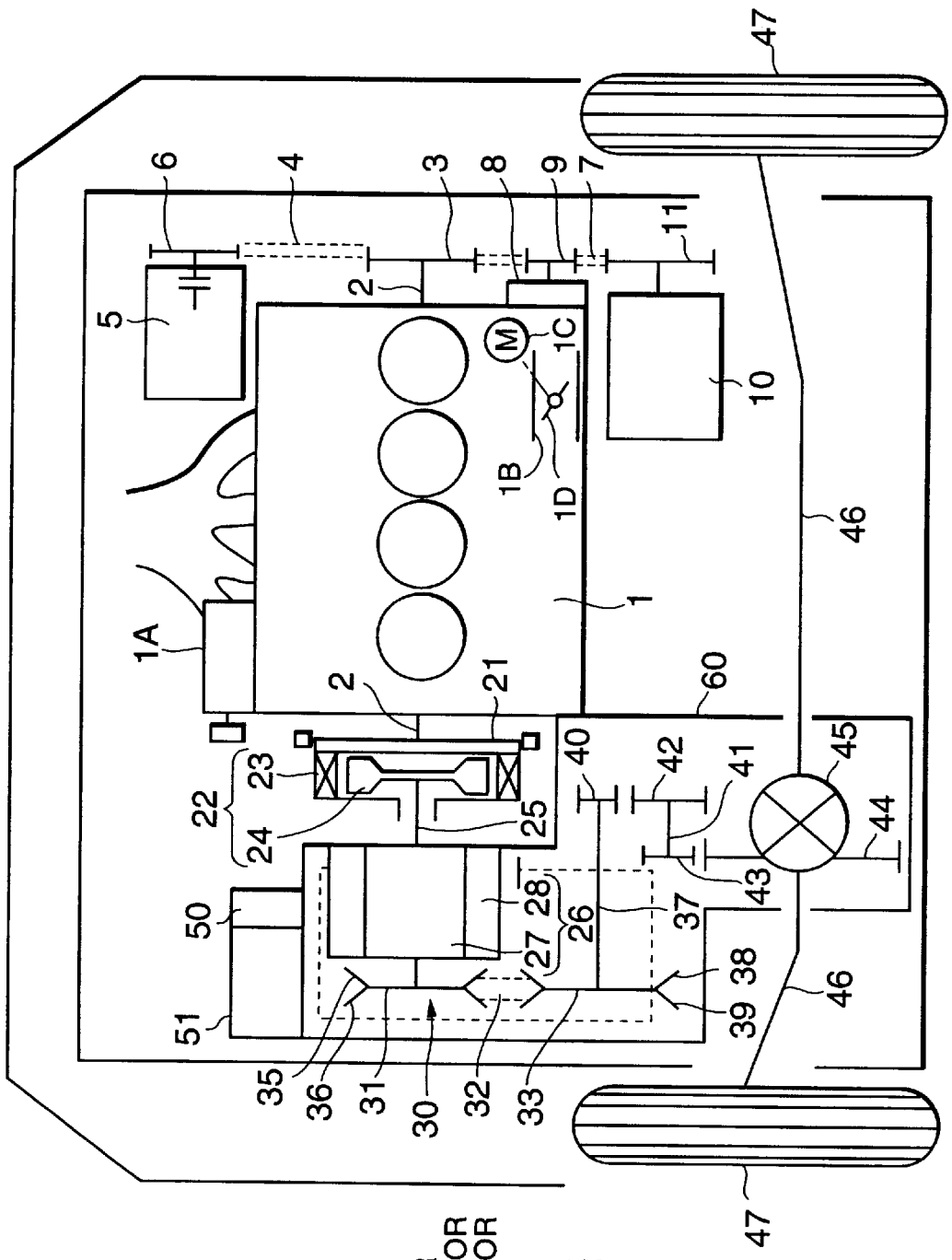
FIG. 1 is a schematic diagram of a vehicle drive device according to this invention.

Referring to FIG. 1 of the drawings, a vehicle is provided with a parallel hybrid drive device comprising a gasoline engine 1 started by a starter motor 1A, two triphase induction motor/generators 10, 26 and a continuously variable transmission 30.

A crank pulley 3 is connected to one end of a crank shaft 2 of the engine 1. The crank pulley 3 drives a pulley 6 of an air conditioner 5 via an auxiliary belt 4, and a pulley 9 of a water pump 8 and a pulley 11 of the triphase induction motor/generator 10 are driven via another auxiliary belt 7.

Figure 2:
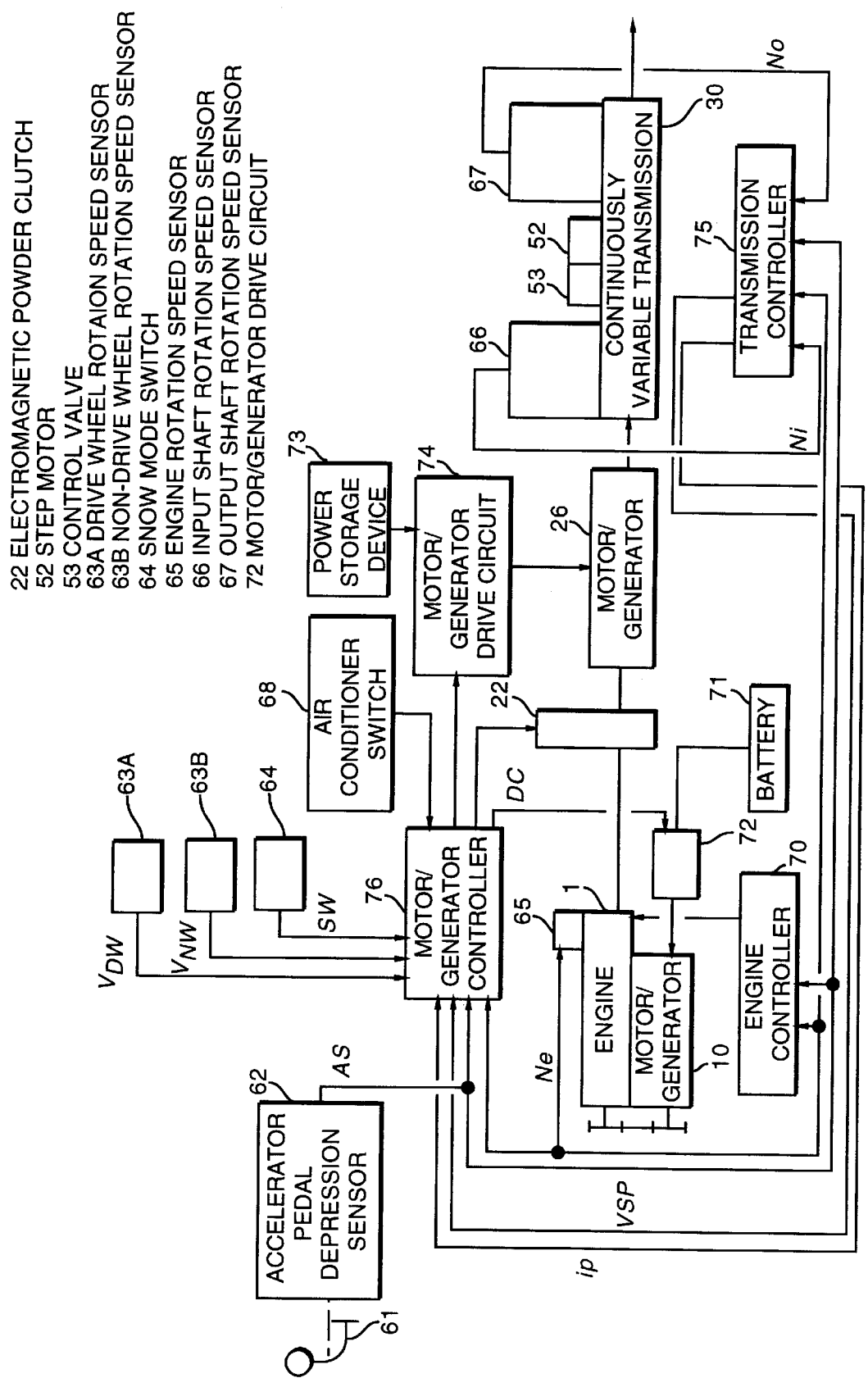
FIG. 2 is a block diagram showing the construction of a control system of the vehicle drive device.

The motor/generator 10 functions as a motor due to a power supply from a battery 71 shown in FIG. 2 and drives the air conditioner 5; when the engine 1 is not running. When the engine 1 is running, the motor/generator 10 functions as a generator which charges the battery 71 and supplies power to auxiliaries, not shown.

The other end of the crank shaft 2 of the engine 1 is connected via a flywheel 21 to a drive member 23 of an electromagnetic powder clutch 22. The drive member 23 has an annular shape and supports energizing coils. A driven member 24 of the powder clutch 22 is supported free to rotate by a drive shaft 25.

The drive shaft 25 is joined to a rotor 27 of the triphase induction motor/generator 26. The triphase induction motor/generator 26 is provided with a stator 28 facing the rotor 27 and comprising plural magnetic poles with windings.

The drive shaft 25 is connected to a V-belt continuously variable transmission 30. The continuously variable transmission 30 is provided with a primary pulley 31 joined to one end of the drive shaft 25, and a secondary pulley 33 joined to primary pulley via the V-belt 32.

The primary pulley 31 comprises a fixed wheel 35 and movable wheel 36, and a V-shaped pulley groove around which the V-belt is looped is formed by these wheels. The width of the pulley groove varies due to an axial displacement of the movable wheel 36 according to oil pressure.

Likewise, the secondary pulley 33 is provided with a fixed wheel 38 and movable wheel 39, and the V-belt is looped around a V-shaped groove formed between the wheels. The rotation shaft 37 of the fixed wheel 38 is joined to a drive gear 40. The drive gear 40 engages with an idler gear 42 supported free to rotate via an idler shaft 41. A pinion 43 which is fixed to the idler shaft 41 engages with a final gear 44. The final gear 44 drives drive wheels 47 via a differential gear unit 45 and drive shafts 46.

The motor/generator 26 and continuously variable transmission 30 are housed together in a casing 60 with a set of gears ranging from the drive gear 40 to the final gear 44.

A hydraulic pump 51 driven by an electric motor 50 is provided outside the casing 60. The oil pressure generated by the hydraulic pump 51 is used to drive the movable wheels 36, 39 of the primary pulley 31 and secondary pulley 33 via a control valve 53. The control valve 53 is controlled via a step motor 52. The hydraulic pump 51 also provides lubricating oil to the mechanisms in the casing 60.

Referring to FIG. 2 of the drawings, the motor/generator 26, engine 1 and continuously variable transmission 30 are respectively controlled by a motor/generator controller 76, engine controller 70 and transmission controller 75. Each of these controllers comprises a microcomputer comprising a central processing unit (CPU), read-only memory (ROM), random-access memory (RAM) and input-output interface (I/O interface).

Various sensors are connected to these controllers 76, 70 and 75.

An accelerator pedal depression sensor 62 detects a depression degree AS of an accelerator pedal 61 of the vehicle and inputs a corresponding signal to the controllers 76, 75 and 70.

An engine rotation speed sensor 65 detects an engine rotation speed Ne of the engine 1, and inputs a corresponding signal to the controllers 76, 75 and 70.

An input shaft rotation speed sensor 66 which detects a rotation speed Ni of the primary pulley 31, and an output shaft rotation speed sensor 67 which detects a rotation speed No of the secondary pulley 33, are installed in the continuously variable transmission 30. The input shaft rotation speed Ni and output shaft rotation speed No detected by these rotation speed sensors 66, 67 are input as signals to the transmission controller 75.

The engine 1 is provided with an electronic throttle 1D for increasing and decreasing an intake air amount of an intake passage 1B as shown in FIG. 1. An electronic throttle 1D is driven by a step motor 1C, and the opening of the electronic throttle 1D is controlled according to an output signal to the step motor 1C from the engine controller 70. Therefore, the output torque of the engine 1 varies according to the output signal of the engine controller 70.

The drive device according to this invention is further provided with a drive wheel rotation speed sensor 63A which detects a rotation speed $V_{DW}$ of the drive wheels 47, a non-drive wheel rotation speed sensor 63B which detects a rotation speed $V_{NW}$ of non-drive wheels, and a snow mode switch 64 which outputs a signal SW to show that the vehicle is running in a low friction road mode such as on a snowy road.

The motor/generator 10 is connected to a battery 71 via a motor/generator drive circuit 72 as shown in FIG. 2. The motor/generator drive circuit 72 comprises a chopper and an inverter. The motor/generator controller 76 operates the motor/generator 10 either as a motor or as a generator by a signal output to the motor/generator drive circuit 72. The voltage of the battery 71 is 12V.

When the engine is driven, the motor/generator 10 functions as a generator. A signal showing the operating state of the air conditioner 5 is input from the air conditioner switch 68 into the motor/generator controller 76 to control the motor/generator 10.

The motor/generator 26 is connected to a power storage device 73 via a motor/generator drive circuit 74. The power storage device 73 comprises a battery and a condenser which can be charged to 345V.

The motor/generator drive circuit 74 is provided with a chopper and an Inverter. The motor/generator controller 76 causes the motor/generator 26 to operate as either a motor or a generator via a signal output to the motor/generator drive circuit 74. The motor/generator controller 76 varies rotation resistance when the motor/generator 26 is made to function as a generator by a signal output to the motor/generator drive circuit 74. The motor/generator controller 76 also controls tightening and release of the electromagnetic powder clutch 22.

The transmission controller 75 controls a drive ratio of the continuously variable transmission 30 through a signal output to the step motor 52.

Figure 3:
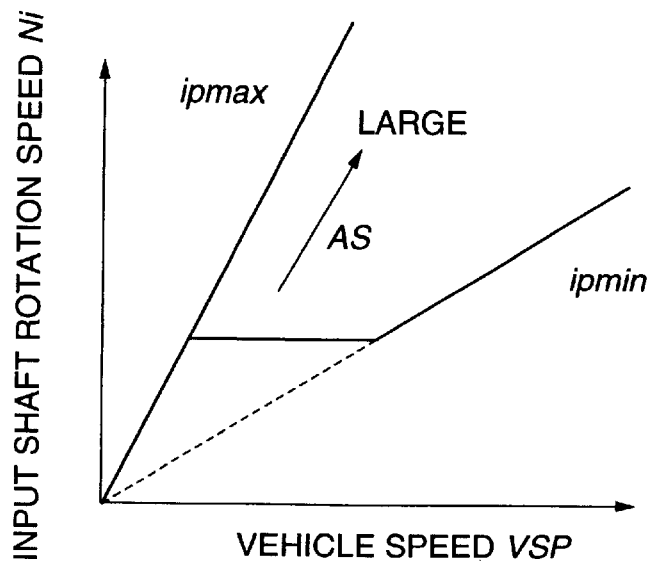
FIG. 3 is a diagram showing the contents of a map of target drive ratio stored by a transmission controller forming the control system.

The transmission controller 75 computes a vehicle speed VSP from the output shaft rotation speed No detected by the output shaft rotation speed sensor 67, and sets a target drive ratio by referring to a map shown in FIG. 3 based on the input shaft rotation speed Ni detected by the input shaft rotation speed sensor 66, the accelerator pedal depression degree AS detected by the accelerator depression sensor 62 and the vehicle speed VSP. In other words, the target drive ratio becomes larger the higher the vehicle speed VSP falls, the larger the accelerator pedal depression degree AS, or the higher the engine rotation speed Ne. A real drive ratio ip is also computed based on the input shaft rotation speed Ni and output shaft rotation speed No, and the step motor 52 is feedback-controlled so that the real drive ratio ip coincides with the target drive ratio.

The control valve 53 driven by the step motor 52 varies the oil pressure applied to the movable wheels 36, 39 of the continuously variable transmission 30, and varies the contact radius of the pulleys 31, 33 with the V-belt. As a result, the drive ratio of the continuously variable transmission 30 varies. It should be noted that the drive ratio in this description is defined as Ni/No.

The motor/generator controller 76 controls the motor/generator drive circuits 72, 74 and the electromagnetic powder clutch 22 based on the accelerator pedal depression degree AS, real drive ratio ip computed by the transmission controller 75, vehicle speed VSP, engine rotation speed Ne, throttle opening TVO set by the engine controller 70, and the input signal SW from the snow mode switch 64. It also outputs a command signal for commanding the engine 1 to start and stop to the engine controller 70.

Figure 4:
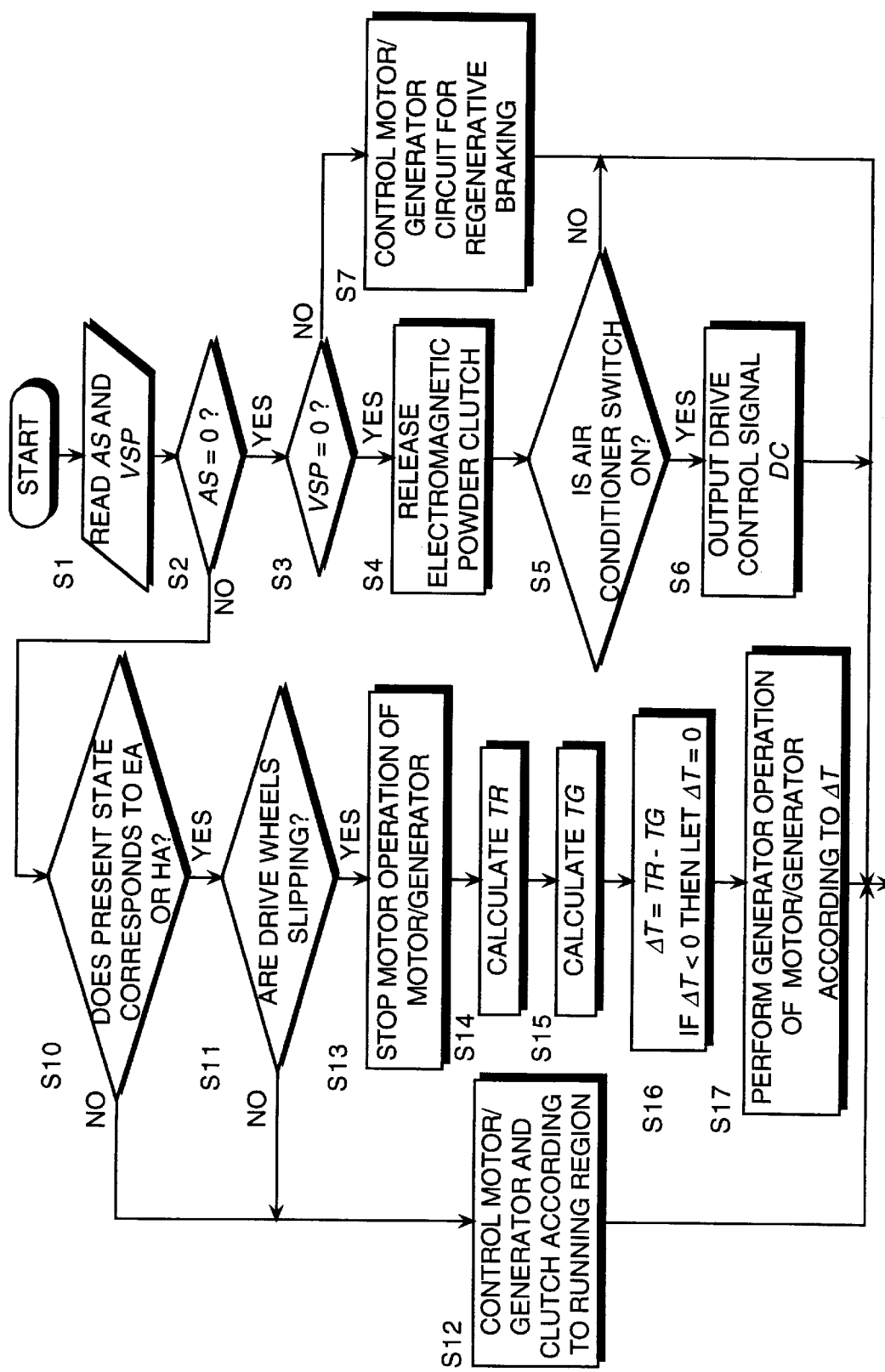
FIG. 4 is a flowchart for describing the motor/generator control process performed by a motor/generator controller forming the control system.

Next, the process for controlling the motor/generator 26 performed by the motor/generator controller 76 will be described referring to the flowchart of FIG. 4. This routine is for example performed by a timer interrupt at an interval of ten milliseconds.

First, in a step S1, the signals necessary to execute the routine are read, such as the accelerator pedal depression degree AS and vehicle speed VSP. In a step S2, it is determined whether or not the accelerator pedal depression degree AS is 0.

When it is determined that the accelerator pedal operation degree AS is 0, in a step S3, it is determined whether or not the vehicle speed VSP is 0.

When the vehicle speed VSP is 0, it is determined that the vehicle is not running and the routine proceeds to a step S4.

In the step S4, the electromagnetic powder clutch 22 is released. This is done by, for example, outputting a clutch control signal CL having a logic value of 0 to the electromagnetic powder clutch 22.

In a following step S5, it is determined whether or not the air conditioner 5 is ON based on the input signal from the air conditioner switch 68. When the air conditioner 5 is OFF, the routine is terminated without performing subsequent processing.

When the air conditioner 5 is ON, the routine proceeds to a step S6, a drive control signal DC which drives the motor/generator 10 as a motor is output to the motor/generator drive circuit 72, and the routine is terminated.

In the step S3, when the vehicle speed VSP is not 0, the routine proceeds to a step S7. Here, a power generation amount is found by referring to an energy recovery amount computing map prestored by the motor/generator controller 76, a corresponding chopper command value and generator operation command signal are output to the motor/generator drive circuit 74, and the motor/generator 26 is operated in a regenerative braking state. The power generated by the motor/generator 26 charges the battery of the power storage device 73. After this processing, the routine terminates. Charging is not performed when the power storage device 73 is sufficiently charged.

On the other hand in the step S2, when AS is not 0, the processing of the step S10 and subsequent steps is performed.

Figure 5:
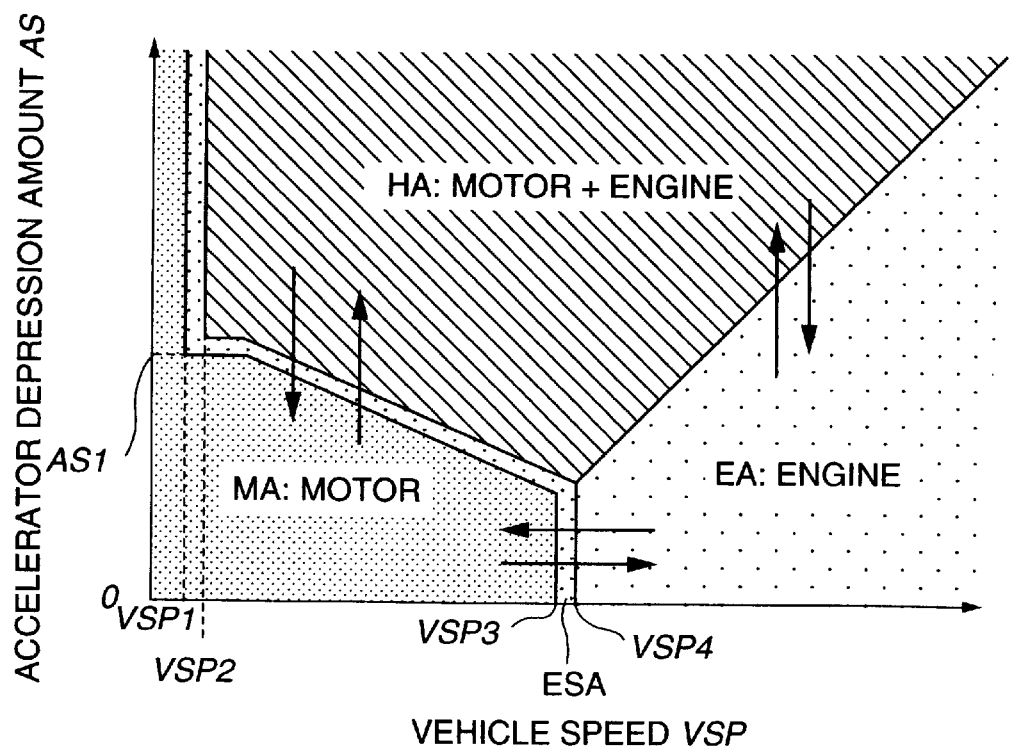
FIG. 5 is a diagram describing the contents of a map of vehicle running regions stored by the motor/generator controller.

First, in the step S10, the present running region of the vehicle is determined by referring to a map shown in FIG. 5 based on the accelerator pedal operation degree AS and vehicle speed VSP. This map is prestored in the motor/generator controller 76.

Describing the contents of this map, a motor running region MA is a region where the vehicle runs under the output of the motor/generator 28 alone. An engine running region EA is a region where the vehicle runs only under the output of the engine 1. A hybrid running region HA is a region wherein the vehicle normally runs only under the output of engine 1, but uses the motor/generator 26 during acceleration. An engine start region ESA exists at the boundary between the motor running region MA and the engine running region EA, and the boundary between the motor running region MA and the hybrid running region HA. It is the region wherein the engine 1 is started.

In this step S10, after determining the present vehicle running region, it is determined whether or not this region is the engine running region EA or the hybrid running region HA. In any of these running regions, drive torque is supplied from the engine 1 to the drive wheels 47, and in this case, the routine proceeds to the step S11. When the present running region of the vehicle is in another region, the routine proceeds to a step S12.

In the step S11, it is determined whether or not the drive wheels 47 are slipping. For this purpose, a slip rate S is calculated by the following equation, based on the drive wheel speed $V_{DW}$ detected by the drive wheel rotation speed sensor 63A and the non-drive wheel speed $V_{NW}$ detected by the non-drive wheel rotation speed sensor 63B.

$$S = \frac{V_{DW} - V_{NW}}{V_{DW}} \cdot 100 \; (\%)$$

When this slip rate S is larger than a preset target slip rate S *, it is determined that the drive wheels 47 are slipping.

When, in the step S11, it is determined that the drive wheels 47 are not slipping, the routine proceeds to a step S12.

In the step S12, the engine 1, motor/generator 26 and electromagnetic powder clutch 22 are controlled according to the running region determined in the step S10, and the routine is terminated. The processing of the step S12 is performed by a subroutine.

In the aforesaid processing, the electromagnetic powder clutch 22 is tightened or released according to the following conditions. Specifically, when the vehicle running region shifts to the engine start region ESA from the motor running region MA, the engine 1 starts, and the engine rotating speed Ne has become equal to the input shaft rotation speed Ni of the motor/generator 26, i.e. the rotation speed of the motor/generator 26, the electromagnetic powder clutch 22 is tightened. When the running state shifts from the engine running region EA or the hybrid running region HA to the motor running region MA, and the accelerator pedal depression degree AS becomes more than a predetermined value, the electromagnetic powder clutch 28 is released. It is also released when the vehicle has stopped. Even when the running state corresponds to the motor running region MA, if the charge amount of the power storage device 73 is low, the engine 1 starts and the motor/generator 26 operates as a generator to charge the power storage device 73.

On the other hand, when it is determined in the step S11 that the drive wheels 47 are slipping, the routine proceeds to the processing of the step S13 and subsequent steps.

First, in the step S13, the operation of the motor/generator 26 as a motor is halted. When the vehicle running pattern corresponds to the engine running region HA, the motor/generator 26 is not operated as a motor, so the routine proceeds to a following step S14 without performing special processing in the step S13.

Figure 6:
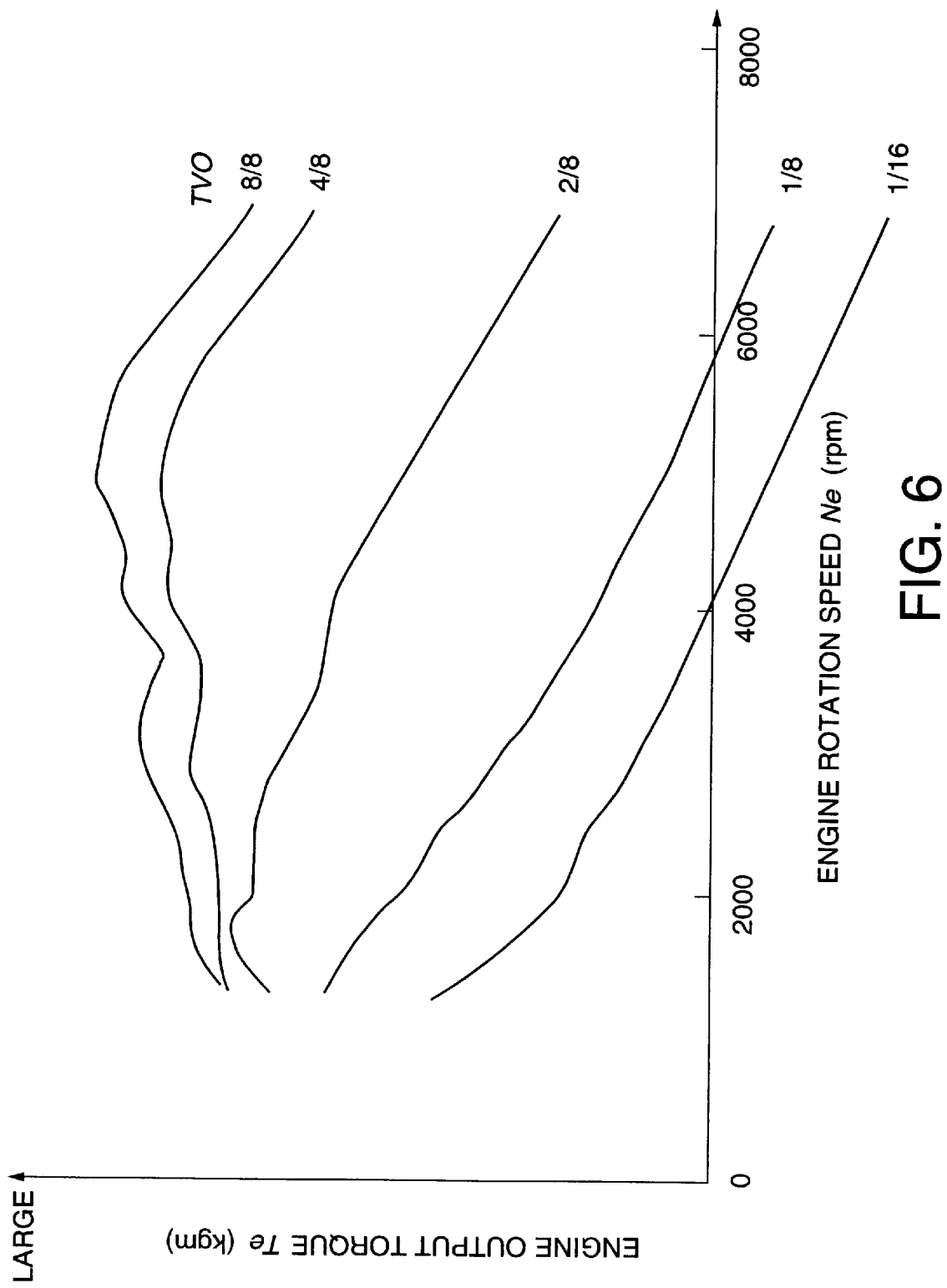
FIG. 6 is a diagram describing the contents of an engine output torque computing map stored by the motor/generator controller.

In the step S14, the drive torque TR which the engine 1 is supplying to the drive wheels 47 is calculated by referring to a map of which the contents are shown in FIGS. 6 and 7, based on the real drive ratio ip computed by the transmission controller 75, engine rotation speed Ne detected by the engine rotation speed sensor 65, and throttle opening TVO set by the engine controller 70. First, an output torque Te of the engine 1 is found by referring to a map of which the contents are shown in FIG. 6 based on the engine rotation speed Ne and throttle opening TVO. When the output torque Te has a negative value in this map, the engine 1 does not generate a torque, and conversely, a torque is input into the engine 1 from the drive wheels, as when the vehicle is coasting.

However, the routine only proceeds to the step S13 when the accelerator pedal 61 is depressed in the step S2, so the output torque Te does not take a negative value in this calculation.

Next, a frictional torque Tf of the continuously variable transmission 30 is calculated by referring to a map of which the contents are shown in FIG. 7, based on the real drive ratio ip and engine rotation speed Ne.

A drive torque TR which the engine 1 actually supplies to the drive wheels 47 is a value obtained by deducting the frictional torque Tf of the transmission 30 from the output torque Te of the engine 1. If the drive torque TR becomes a negative value as a result of calculation, TR is set to 0.

In a step S15, a frictional coefficient $\mu$ of the running surface is determined according to the input signal SW from the snow mode switch 64. This frictional coefficient $\mu$ is then multiplied by a tire load W calculated beforehand so as to calculate a grip force TG of the tire fitted to the drive wheels 47.

The frictional coefficient $\mu$ is set as follows.

When the snow mode signal SW takes a value of 1, meaning a low friction road, the frictional coefficient for a low friction road found previously by experiment is taken as the value of $\mu$. When the snow mode signal SW takes a value of 0, meaning a high friction road, the frictional coefficient for a high friction road found previously by experiment is taken as the value of $\mu$.

In a step S16, the grip force TG is deducted from the drive force TR of the drive wheels 47, and an excess torque $\Delta T$ is computed. Even if the drive wheels 47 are driven with a drive force exceeding the grip force TG, the driving force of the vehicle does not increase as the drive wheels 47 slip. The slip of the drive wheels 47 is therefore prevented by using the excess torque ΔT for power generation by the motor/generator 26. When the excess torque ΔT has a negative value, i.e. when the torque applied to the drive wheels 47 is not excessive, the excess torque ΔT is set to 0.

When the engine 1 and motor/generator 26 apply a torque to the drive wheels 47 in the hybrid running region HA, it may occur that the drive wheels 47 slip depending on the drive torque supplied by the motor/generator 26 even if the drive torque TR supplied by the engine 1 to the drive wheels 47 is not excessive. In such a case, slip is suppressed by simply stopping operation of the motor/generator 26 as a motor. It is in this case that the excess torque ΔT is 0.

In a final step S17, a signal is output to the motor/generator drive circuit 74 so that a torque equivalent to the excess torque ΔT is input to the motor/generator 26. Therefore, when the excess torque ΔT is 0, the motor/generator 26 is not being operated.

Next, the above-mentioned control will be described for specific cases.

First, it will be assumed that the snow mode switch 64 is ON, and the vehicle is running in the hybrid running region HA. When, for example, the accelerator pedal 61 is depressed, the generator/motor 26 applies a drive torque to the drive wheels 47. If a slip is then detected in the step S11, the processing of steps S13–S17 is performed.

First, operation of the motor/generator 26 as a motor is stopped, the drive torque TR which the engine 1 applies to the drive wheels 47 is calculated, and the grip force TG using a road surface coefficient of friction for a low friction road is calculated. When the drive torque TR is larger than the grip force TG, the excess torque ΔT which is the difference is applied as a load to the motor/generator 26, and a signal is output to the motor/generator drive circuit 74 so that the motor/generator 26 functions as a generator.

As a result, the drive torque applied by the engine 1 to the drive wheels 47 decreases, the drive wheels 47 stop spinning, and the grip of the road surface is restored.

When the excess torque ΔT has a negative value in the above process, ΔT is reset to 0 in the step S16. In this case, the motor/generator 26 is not operated as a generator in the step S17. In other words, if the torque applied by the engine 1 to the drive wheels 47 is not excessive, it should be possible to resolve the problem of slip simply by stopping operation of the motor/generator 26 as a motor. Consequently, there is no need to operate the motor/generator 26 as a generator.

Also, when the snow mode switch is OFF, if slip is detected in the step S11, the processing of the steps S13–S17 is basically performed as described above. In this case, however, as the snow mode switch is OFF, the grip TG calculated in the step S15 is based on a frictional coefficient μ for a high friction road.

In this way, the grip force TG and excess torque ΔT can be precisely computed by varying the frictional coefficient μ according to the snow mode signal SW, and therefore, the drive torque of the drive wheels 47 may be precisely reduced as necessary to prevent spin.

As spin of the drive wheels 47 is suppressed before the continuously variable transmission 30 shifts the drive ratio, the drive ratio of the continuously variable transmission 30 does not change appreciably from what it was previously.

Therefore, even if the drive torque is reduced on a low friction road, the drive ratio does not become small, and when the road surface changes to a high friction road, the vehicle achieves the acceleration performance desired by the driver according to the depression of the accelerator pedal 61.

In this drive system, spin is prevented by controlling the motor/generator 26 instead of controlling the engine 1 or the continuously variable transmission 30, so the control load on the engine controller 70 and that on the transmission controller 75 do not increase.

Also, excess torque is used for charging the motor/generator 26, so there is no energy wastage in the suppression of the wheel spin.

The contents of Tokugan Hei 9-358583 with a filing date of Dec. 25, 1997 in Japan and Tokugan Hei 10-301187 with a filing date of Oct. 22, 1998 in Japan, are hereby incorporated by reference.

Although the invention has been described above by reference to certain embodiments of the invention, the invention is not limited to the embodiments described above. Modifications and variations of the embodiments in light of the above teachings.

In this embodiment, the frictional coefficient μ of the running surface is changed based on a signal from the snow mode switch 64, but the frictional coefficient μ may also be changed according to other elements. For example, when the drive ratio shifting pattern of the continuously variable transmission 30 is different for normal running and on a low friction road, the frictional coefficient μ may be changed with change-over of this pattern.

The throttle opening TVO used for calculation of the step S14 varies according to the depression of the accelerator pedal 61. Therefore the throttle opening TVO may be found from the accelerator pedal depression degree AS instead of detecting it from the signal from the engine controller 70.

Also, the drive torque TR calculated in the step S14 may be calculated by the following equation instead of the calculation equation already described.

$$TR = \frac{Tp \cdot ip \cdot if}{R}$$

where,

Tp=torque applied by the engine 1 to primary pulley 31, ip=real drive ratio of continuously variable transmission 30, if=gear ratio of final gear 44, and R=dynamic load radius of a tire of a drive wheel 47.

A toroidal type continuously variable transmission may be used instead of a V-belt type for the continuously variable transmission 30. Also, a conventional gear type transmission can be used instead of the continuously variable transmission.

The motor/generator 26 may be joined to the output shaft 37 instead of the input shaft 25 of the continuously variable transmission 30.

Instead of the motor/generator 26, a separate motor and generator may be applied.

Further, the invention may be applied to a vehicle drive device wherein a generator without a motor function is joined to the drive wheels.

The embodiments of this invention in which an exclusive property or privilege is claimed are defined as follows:

What is claimed is:

1. A vehicle drive device wherein a generator and a drive wheel are connected to an engine which accelerates according to a depression of an accelerator, said drive device comprising:

a sensor for detecting a depression of said accelerator, a sensor for detecting a slip of said drive wheel, a drive circuit for varying the rotation resistance of said generator, and a microprocessor programmed to:

control said drive circuit so as to increase the rotation resistance of said generator if a slip of said drive wheel is detected when said accelerator pedal is depressed.

2. A vehicle drive device as defined in claim 1, wherein said drive device further comprises a sensor for detecting a frictional coefficient of a road surface on which said vehicle is traveling, and said microprocessor is further programmed to control said drive circuit so as to vary the increase amount of rotation resistance of said generator according to the road surface frictional coefficient.

3. A vehicle drive device as defined in claim 2, wherein said engine comprises a throttle for increasing or decreasing an intake air amount, said drive device further comprises a transmission for transmitting a rotation of said engine to said drive wheel at a drive ratio according to the rotation speed of said drive wheel, a sensor for detecting a rotation speed of said engine, a sensor for detecting an opening of said throttle, and a sensor for detecting a real drive ratio of said transmission, and said microprocessor is further programmed to calculate a drive torque applied by said engine to said drive wheel based on the rotation speed of said engine, the opening of said throttle and the real drive ratio of said transmission, calculate a grip force of said drive wheel based on said frictional coefficient, calculate an excess torque by subtracting said grip force from said drive torque, and increase the rotation resistance of said generator according to said excess torque.

4. A vehicle drive device as defined in claim 1, wherein said generator comprises a motor/generator which functions as a motor when power is supplied and functions as a generator when a rotation torque is input, and said microprocessor is further programmed to control said circuit to supply power to said motor/generator when said slip is not detected, and to stop supplying power to said motor/generator when said slip is detected.

5. A vehicle drive device wherein a generator and a drive wheel are connected to an engine which accelerates according to a depression of an accelerator, said drive device comprising:

means for detecting a depression of said accelerator, means for detecting a slip of said drive wheel, means for varying the rotation resistance of said generator, and means for controlling said varying means so as to increase the rotation resistance of said generator if a slip of said drive wheel is detected when said accelerator is depressed.

6. A control method of a vehicle drive device, wherein said device comprises an engine for driving a drive wheel and a generator according to a depression of an accelerator pedal, and said generator comprises a drive circuit which varies the rotation resistance of said generator, said control method comprising:

determining whether or not said accelerator pedal is depressed, determining whether or not said drive wheel is slipping, and controlling said drive circuit to increase the rotation resistance of said generator when said accelerator is depressed and said drive wheel is slipping.

* * * * *